May 11, 1965 J. J. COCHRAN 3,182,542
CLAMP CONTROL APPARATUS
Filed Oct. 2, 1961 3 Sheets-Sheet 1

INVENTOR.
JAMES J. COCHRAN
BY
Marshal, Biebel, French & Bugg
ATTORNEYS

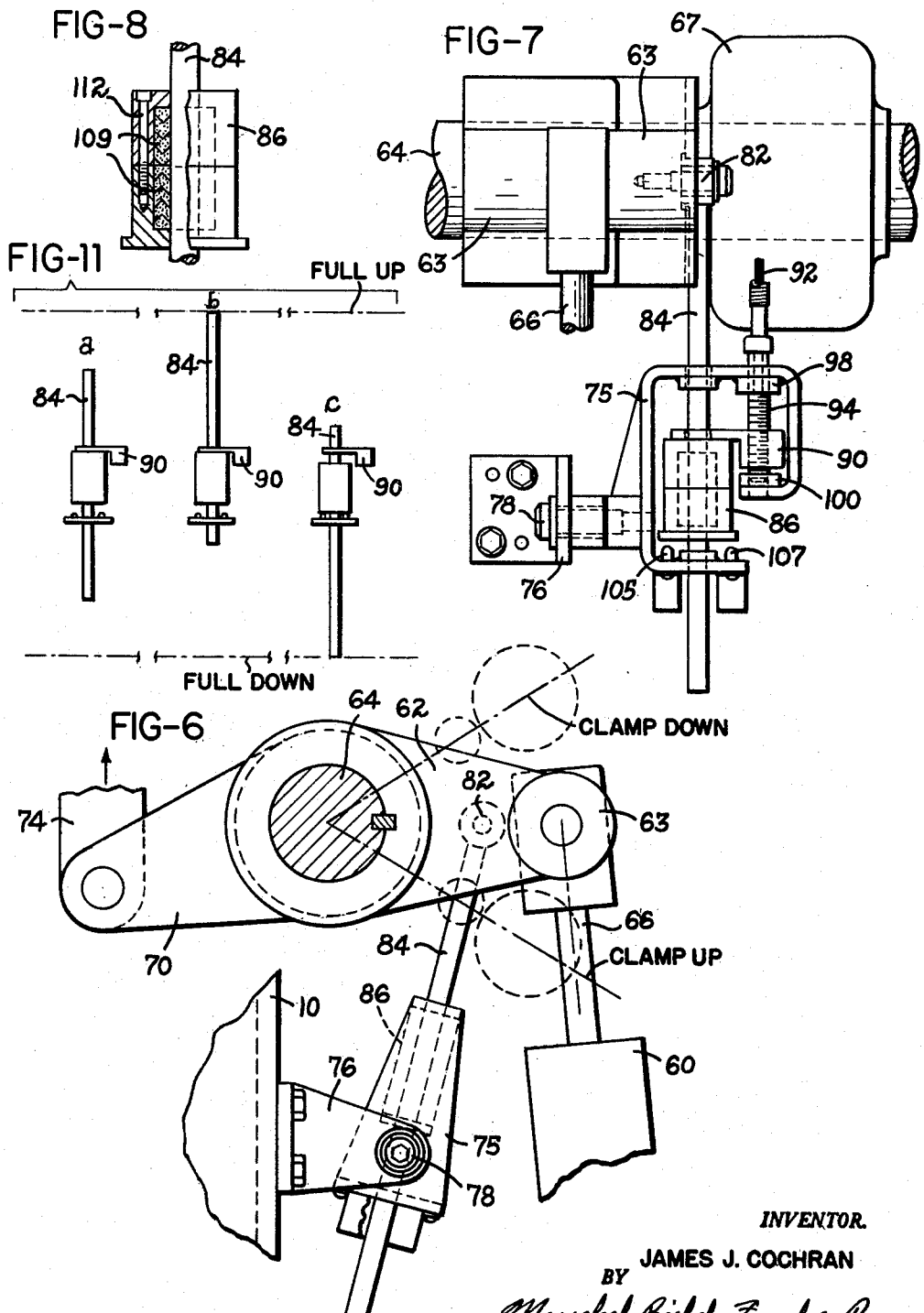

3,182,542
CLAMP CONTROL APPARATUS
James J. Cochran, Dayton, Ohio, assignor to Harris-Intertype Corporation, Cleveland, Ohio, a corporation of Delaware
Filed Oct. 2, 1961, Ser. No. 142,304
8 Claims. (Cl. 83—453)

This invention relates to machines for cutting paper and the like and more particularly to a novel clamp assembly and positioning means therefor.

In cutting machines adapted to cut various sizes of stock of varying thickness, the stock is held in position for the cutting operation by a clamp prior to the cutting action of the knife. As the stock is thus engaged by the clamp, a knife blade positioned on one side of the clamp comes down and cuts through the stock. After the cutting operation is complete, the clamp and the knife are raised to an upper position and the machine is ready for the next clamping and cutting cycle.

In operations involving cutting and trimming jobs, it is often necessary to check closely the positioning of the paper with respect to the cutting plane. Since the face of the clamp member offers a convenient guide, this is normally accomplished by carefully bringing the clamp close to the surface of the pile by use of a clamp treadle to ascertain the exact point of the cutting plane. It is desirable in such an operation to be able to adjust the fully raised position of the clamp such that it will rest a short distance above the pile, so that during this preliminary inspection, the operator need not employ the clamp treadle once the proper adjustment has been made. It is also desirable to be able automatically to position the clamp a preset distance above the stock or pile regardless of the height of the pile. Such a procedure eliminates much of the "dead" time involved as a result of raising the clamp to the fully raised position when the operator is cutting a small thickness of stock. Additionally, it saves time in aligning the pile in the cutting plane since the clamp is very close to the surface of the pile and it is not necessary to employ the treadle for bringing the clamp down close to the pile.

In cases where soft paper, pressure sensitive "carbonless copy" paper and the like are being cut, movement of the clamp from the fully raised position to the clamping position may exert sufficient pressure on the paper to leave a permanent impression thereon while the pressure of the clamp during the clamping cycle would not produce such an impression. For example, if a two inch pile of soft paper is being cut, the downward movement of the clamp a distance of four inches may be enough to mark the paper because of the downward momentum of the clamp. Marking of the paper normally would not occur during the clamping cycle since the operator may adjust the clamping pressure to such value as is necessary to hold the paper and yet not mark the paper. If the clamp can be positioned a short distance above the surface of the pile, there would be very little pressure exerted as a result of the downward momentum of the clamp. In this situaiton, it is desirable to provide a clamp assembly which can be automatically positioned a small distance above the stock, regardless of the thickness of the stock, so that downward movement of the clamp does not exert sufficient pressure to permanently mark the paper.

As is usual with paper cutters of this size and type, an automatic or manually operated back gage or spacer may be employed to advance the pile for the next clamping and cutting cycle. Such a back gage normally becomes operative subsequent to the movement of the clamp to the fully raised position, and there is some "dead" time involved in instances where piles of small height are being cut due to the fact that prior to operation of the back gage, the clamp must be raised to the fully raised position. This "dead" time with respect to operation of the back gage is substantially reduced in accordance with this invention by allowing operation of the back gage at such time as the clamp is positioned intermediate its fully raised position, and a small distance above the pile, in accordance with the preselected adjustment of the clamp height. Further, it is possible with the clamp control mechanism of the present invention to raise the clamp to the fully raised position at the end of a cutting sequence regardless of the previous adjustment of the clamp height with respect to the height of the pile.

Accordingly, it is a primary object of this invention to provide a novel clamp positioning assembly for paper cutting machines and the like.

It is another object of this invention to provide a clamp control assembly which allows positioning of the clamp a predetermined distance above the stock or pile of material to be cut when the clamp is in the raised position.

Another object of this invention is to provide a clamp assembly which automatically positions the clamp a predetermined distance above the stock when the clamp is in the raised position regardless of the height of the pile.

Still another object of this invention is the provision of a novel clamp assembly which may be positioned a preselected distance above a first pile and which may be positioned automatically the same preselected distance above the surface of a second pile which is smaller in height than the first pile.

A further object of this invention is to provide a clamp assembly which can be moved to a fully raised position regardless of a previous adjustment at an intermediate raised position of the clamp.

It is a further object of this invention to provide a clamp control assembly which enables operation of a back gage or spacer as soon as the clamp is raised to a predetermined distance above the surface of the pile being cut, thereby reducing the time involved for initiating operation of the back gage subsequent to the movement of the clamp.

A still further object of this invention is the provision of a clamp assembly which may be automatically raised to the fully raised position as the last cutting cycle of a cutting operation takes place, regardless of the previous adjustment of the intermediate raised position of the clamp.

It is still a further object of this invention to provide an adjustable clamp control assembly which enables positioning of the clamp in a raised position a small distance above the pile such that downward momentum of the clamp during the clamping operation is insufficient to mark the surface of the paper.

Other objects and advantages of the invention will be apparent from the following description, the accompanying drawings and the appended claims.

In the drawings—

FIG. 6 is an enlarged view showing the details of the clamp control mechanism as shown in FIG. 2;

FIG. 7 is an enlarged view of the details of the clamp control mechanism as seen from the right of FIG. 6;

FIG. 8 is an enlarged view, partly in section and partly in elevation, of the sensor shown in FIG. 7;

FIGS. 11a, b and c illustrate in schematic fashion the position of the sensor on the follower as the clamp is moved to different raised positions during various clamping operations.

Figure 1:
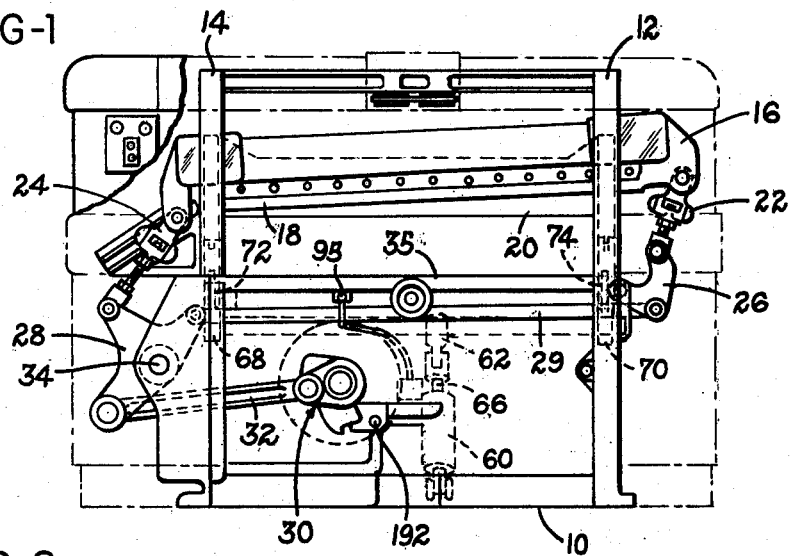
FIG. 1 is a schematic front elevation of a cutting machine constructed in accordance with this invention showing the relative position of the clamp and knife assemblies and the control apparatus for the clamp.
Figure 2:
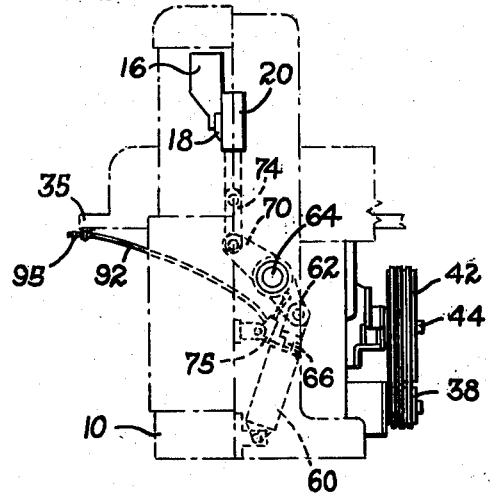
FIG. 2 is a schematic side elevation of the apparatus of FIG. 1 showing the position of the clamp, knife blade, and clamp control apparatus.

Referring to the drawings, which illustrate a preferred embodiment of the present invention, FIGS. 1 and 2 show a cutting machine having a base 10, and side frame members 12 and 14 having guide channels therein for movement of the knife bar 16 carrying the knife blade 18. Located to the rear of the knife bar and blade is the clamp member 20 which moves in a plane parallel to the knife blade 18. At the ends of the knife bar are fixed link assemblies 22 and 24 which are attached respectively to bellcranks 26 and 28, the latter being interconnected by a cross bar 29.

The operation of the knife bar is effected by means of a knife actuating assembly 30 having a connecting rod 32 affixed to the bellcrank 28. As the knife assembly is set in operation, the actuating assembly 30 makes one complete revolution causing bellcrank 28 to rotate about point 34 and bringing the knife bar and blade downward and laterally in guillotine fashion for a cutting stroke which terminates as the knife bar lies parallel to the work table 35 and in proper contact with the usual cutting stick.

Figure 3:
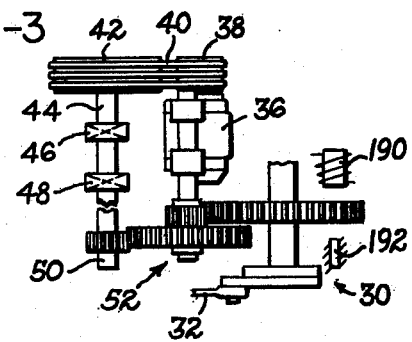
FIG. 3 is a schematic top plan view showing the driving mechanism for the knife assembly.
Figure 4:
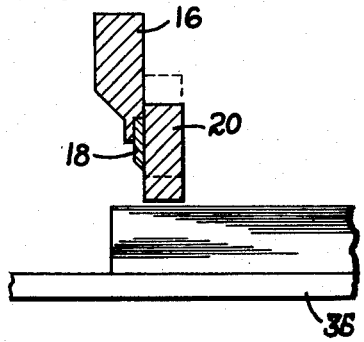
FIGS. 4 and 5 are side views of the clamp and knife, on an enlarged scale, in the upper position showing the clamp a preset distance above piles of stock of different thickness.

Power for the knife assembly is supplied from a drive motor 36 located to the rear of the machine and having a drive pulley 38 over which turns a flywheel 42 through a plurality of V-belts 40 for rotating a drive shaft 44 as shown in FIG. 3. A clutch 46 and brake 48 are provided for controlling the interconnection between drive shaft 44 and countershaft 50, and the movement of such countershaft, respectively. By a suitable gear arrangement 52, the knife actuating assembly 30 is caused to make one complete revolution thereby rotating the bellcranks 26 and 28 as discussed above.

For further information concerning the details of the knife and knife actuating assembly, reference is made to the U.S. patent to Spiller et al. 2,599,591 issued June 10, 1952.

In cutting or trimming various sized piles of different thickness, it is necessary to hold the pile of stock in a fixed position during the guillotine cutting action of the knife blade so that there will be no torn or ragged edges. This is accomplished by means of clamp 20 which reciprocates in a direction toward and away from the work table 35. Operation of the clamp is controlled by means of a hydraulic piston assembly 60 affixed at one end to the base 10 and at the other end to the bifurcated portion 63 of rocker arm 62 which is keyed to the driving rod 64, as shown in FIG. 6. As the drive rod 64 is rotated in the pillow or bearing block 67 (FIG. 7) by the movement of piston rod 66, the end links 68 and 70 (FIGS. 1 and 2) affixed to the drive rod 64 rotate to move driving linkages 72 and 74, respectively, thereby moving the clamp member in a vertical plane.

As shown in FIGS. 2, 6 and 7, a clamp control housing 75 is pivotally mounted by a bracket 76 and bolt 78 to the frame 10 of the machine. Pivotally affixed, as at 82, to the rocker arm between the piston rod 66 and the drive rod 64, is a follower 84 which moves through the housing and engages sensor 86. An adjustable stop 90 which controls the upward movement of the sensor 86 is located within the housing 75 and has an aperture therein for passage of the follower 84. The position of the stop 90 is adjusted by a Bowden wire 92 which has a threaded member 94 affixed at one end, and a control knob 95 affixed to the other end and located beneath the work table 35 as shown in FIGS. 1 and 2. The threaded member 94 is maintained in proper position in the housing 75 by bushings 98 and 100 which are affixed to the interior of the housing.

The sensor 86 has chevron or V-shaped packing 109 compressed in the body by a bolt 112, and accordingly the sensor will travel with the follower until it strikes either the adjustable stop 90 or the switches 105 and 107 (FIG. 7). The V-shaped packing 109 is arranged within the sensor such that one-half of the total packing will always be in frictional engagement with the follower regardless of the direction of the follower movement, as shown particularly in FIG. 8. This packing offers sufficient resistance such that the sensor will travel with the follower until it strikes a fixed member and at that point the movement of the follower through the sensor will overcome the frictional engagement of the packing to allow the follower to pass through the sensor.

The operation of the clamp control assembly can be understood with reference to FIGS. 4–7. After the operator has placed a pile to be cut on the work table and has properly blocked the pile to make sure that the edges of the sheets are even, the clamp is brought down to the surface of the pile by movement of the piston 66 out of the cylinder in a generally vertical direction, thereby rotating rocker arm 62 and drive rod 64 to bring the clamp down. As the rocker arm is rotated, the follower will move in a generally vertical direction carrying the sensor actuator switches 105 and 107. Should the sensor 86 strike the adjustable stop 90, the follower will continue to pass through the sensor as the clamp is not yet in the clamp position, while the sensor will remain stationary against the adjustable stop.

The clamping pressure is now applied and the clamp firmly holds the pile for the cutting action of the knife blade. After the cut has been made, the piston 66 is retracted into the cylinder 60, rotating the rocker arm to raise the clamp. The movement of rocker arm 62 causes follower 84 to move through the housing 75, carrying the sensor with the follower to strike actuator switches 105 and 107 thereby stopping the clamp cylinder 60, as explained later, and allowing movement of a back gage which advances the pile for the next cut. The operation of the back gage may be such that it is manual or automatic, but in either event, an appropriate circuit prevents movement of the clamp in the downward direction until such time as the back gage has completed its movement. Such an interlock prevents clamping during the movement of the pile by the back gage and avoids possible interference of the clamp with the moving back gage. The clamp is now in a position above the pile a distance corresponding to the adjustment of stop 90 as shown for example in FIG. 4. The relative position of the sensor on the follower is shown in FIG. 11a.

It will be understood that movement of the control knob 95 causes rotation of cable 92 and threaded member 94 resulting in movement of the stop 90 within the housing 75. The distance the clamp is raised above the surface of the pile is proportional to the distance between stop 90 and switches 105–107. As the distance between the switches and the stop 90 increases, the distance the clamp will be raised above the pile is increased a proportional amount. This movement of the stop 90 relative to the switches 105–107 controls the upward movement of the clamp with respect to the surface of the pile of material being cut.

Should the same height pile be cut during the second cutting cycle, the sensor will travel with the follower 84 and strike stop 90, and at this point the clamp will be at the surface of the pile with the clamping pressure applied. After the second cut has been made, the sensor will move with the follower and terminate the upward movement of the clamp as the sensor strikes switches 105 and 107. The same sequence is followed during the remainder of this cutting operation as successive piles of the same height are cut, that is, the clamp will be in the clamping position as the sensor abuts the adjustable stop and accordingly, the follower will not travel through the sensor.

In the above operation involving the use of a back gage controlled by an automatic spacer, which is well known in the art, the contact between the sensor and switch 107 enables operation of the back gage at such time as the clamp is halted in the partially raised position. Once the sensor moves off switch 107 movement of the back gage is prevented by an interlock circuit connected by a suitable and conventional interlock circuit connected to switch 107, as will be discussed in connection with the wiring diagram. In this method of operation, wherein the clamp is raised a short distance above the surface of the pile, the operation of the back gage may be initiated as soon as the clamp has ceased its upward movement. One advantage of this mode of operation is that it is not necessary to wait until the clamp is raised fully before energizing the back gage. This results in saving of time due to the fact that the back gage is being raised a sufficient distance above the surface of the paper to allow movement of the pile, and there is immediate clamping once the pile is in the proper position. Further, the operator may quite conveniently check the position of the paper since the clamp is positioned such a short distance above the surface of the pile.

The operator may desire to cut another pile or stack of paper which because of its characteristics must be arranged and cut in piles of smaller height than those of the above described operation. After the paper has been properly blocked on the work table, the operator brings the clamp into close contact with the surface of the pile by means of a treadle or other suitable control. As the clamp begins to move, the follower will be moved through the housing carrying the sensor along with it and when the sensor abuts the stop, the clamp would be in the proper clamping position for the first cutting operation as shown in FIG. 11a, but above the thinner pile of the second cutting operation. Accordingly, as the clamp is brought down further, the follower will be pulled through the sensor because the clamp must be moved a greater distance to reach the clamping position. FIG. 11b illustrates the relative position of the sensor on the follower with the clamp in the clamping position and holding a pile of smaller height.

Figure 5:
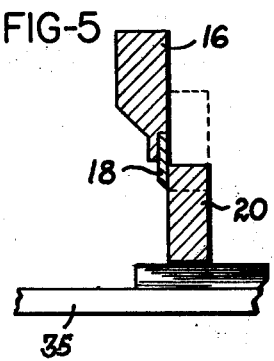

After the first cut of the second cutting operation, the clamp will be raised the same distance above the small pile as it was raised above the pile in the first cutting operation, as illustrated in FIG. 5. When the cutting cycle is completed, the follower moves into the housing, carrying with it the sensor which strikes the switches 105 and 107 to stop the clamp cylinder and enable operation of the back gage.

The third type cutting operation involves raising the clamp to the fully raised position after it has been in a lower position to accommodate a pile of greater thickness than that previously cut. In order to raise the clamp to the fully raised position, it is necessary to disable switch 105 or the hydraulic fluid cannot escape from the head end of the clamping cylinder, thereby preventing the clamp from being raised farther. After the switch 105 has been disabled by an appropriate electrical circuit, the clamp is moved and the follower moves downward through the housing as is shown in the drawings. Since the switch 105 has been disabled, the clamp rises to the fully raised position and is held there by hydraulic pressure. The sensor is now positioned on the follower as shown in FIG. 11c, for example. As piles of decreasing height are cut, the sensor will be moved on the follower in the manner described in connection with FIG. 11b.

It is understood that the spacing of the clamp above the pile, when the clamp is in the raised position, is controlled by adjustable stop 90 which controls the position of the sensor 86 relative to switches 105–107. As the distance between stop 90 and the switches is varied by moving the stop, the distance the sensor moves relative to the switches varies and the distance the clamp moves above the surface of the pile varies in accordance with the position of stop 90. Moreover, regardless of the position of the sensor on the follower, the clamp when moving upwardly will always come to rest the same distance above the pile, due to the fact that the distance between the adjustable stop and the switches is the same, providing the adjustable stop has not been moved.

Figure 9:
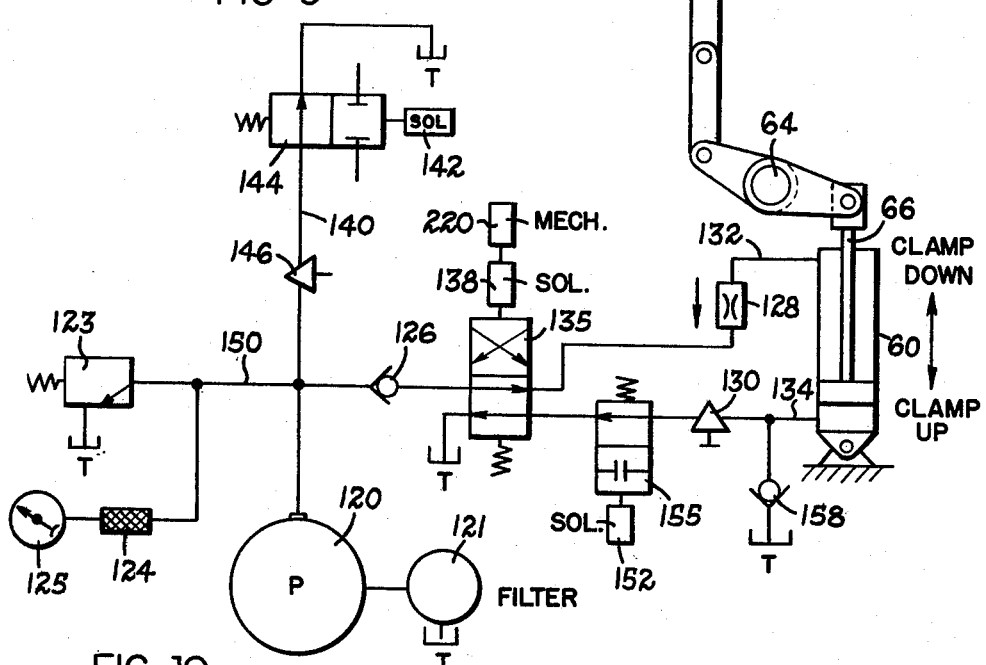
FIG. 9 is a schematic diagram of a hydraulic power system for the clamp assembly.

A suitable hydraulic system for operation of the clamp 20 is shown in FIG. 9 where the clamp cylinder 60, clamp piston 66, drive rod 64 and associated linkage are shown in schematic form. Hydraulic pressure is created within the system by means of pump 120 which draws the hydraulic fluid through the filter 121 from a reservoir or tank T. The pressure developed by the pump 120 is controlled by a relief valve 123 which has one side thereof connected to a low pressure system or tank T. A choke 124 and pressure gage 125 are operatively connected into the hydraulic circuit between the hydraulic pump and the relief valve. Located in the fluid conducting system between the pump and the clamp cylinder is a check valve 126 which prevents the flow of fluid from the clamp cylinder to the pump. A pair of control valves 128 and 130 are connected in conduits 132 and 134, the latter conduits connecting the clamp cylinder with a clamp control valve 135. The clamp valve 135 is controlled by solenoid 138 to determine the direction of flow for controlling the upward and downward movement of clamp piston 66. As shown in the drawing, the valve 135 is positioned to allow flow to the top of the cylinder 60 for retracting the piston while allowing fluid to escape from the base of the cylinder through conduit 134 and valve 155 to the low pressure section or tank T.

Since it is sometimes desirable to operate the clamp at a low pressure, as compared to the relatively high pressure needed for the clamping action, an additional line 40 is provided which connects a dump valve 144 operated by solenoid 142 into the system through an adjustable needle valve 146. The pressures in the hydraulic system are so controlled that there is always a minimum operating pressure in line 150 sufficient to hold the clamp in the raised position without the use of mechanical holding or locking means.

Positioned in conduit 134 is the clamp control or gaging valve 155 operated by solenoid 152 which serves to cut off the exhaust of hydraulic fluid from the clamp cylinder as the sensor strikes switch 105. As the clamp moves to the raised position, the sensor strikes the switch 105 energizing the solenoid 152 which then positions valve 155 such that fluid is prevented from being ported out of the piston, since the output conduit 134 has now been closed by valve 155. Tapped into conduit 134 is a check valve 158 which allows fluid to flow from the low pressure line or tank T to the rear of the clamp cylinder 60 as the piston 66 moves out of the cylinder, as when the clamp is lowering but has not engaged the pile.

In operation, the pressure of the system is adjusted by a relief valve 123, and as the operator engages suitable safety handles, solenoid 142 is activated to seal conduit 140 from the low pressure line, and simultaneously therewith solenoid 138 is activated allowing fluid to flow through valve 135 to conduit 134 while conduit 132 is connected to the low pressure return line. Since the flow of pressure fluid may lag behind the movement of the clamp 20 as it lowers, fluid is drawn up through check valve 158 so that the cylinder is filled rapidly with fluid and the clamping pressure is applied immediately.

After the knife blade has cut through the pile, solenoid 137 is deactivated and the valve 135 is in the position shown in the drawing. Pressurized fluid is now flowing from conduit 150 through valves 135 and 128 to conduit 132 and the clamp cylinder, thereby retracting the piston into the cylinder and raising the clamp. Hydraulic fluid flows from the clamp cylinder through conduit 134, valve 155 and valve 135 to the tank or return line T. As the sensor 86 strikes the switch 105, the solenoid 152 is activated closing conduit 134 from the return line thereby preventing the flow of fluid therein, and stopping movement of the piston. With the solenoid 152 energized, fluid is trapped between check valve 126, conduit 132, clamp cylinder 60, check valve 158 and valve 155 to hold the clamp in the raised position. At the same time, solenoid 142 is deenergized to open a dump path to the tank or the low pressure return line.

In the case where the operator desires to position the clamp in the fully raised position, solenoid 152 is effectively taken out of the circuit thereby allowing valve 155 to remain as shown in FIG. 9. Since solenoids 142 and 138 are energized when the clamp is in the fully raised position, the clamp is held in that position by the low pressure maintained in the system by valve 146.

Figure 10:
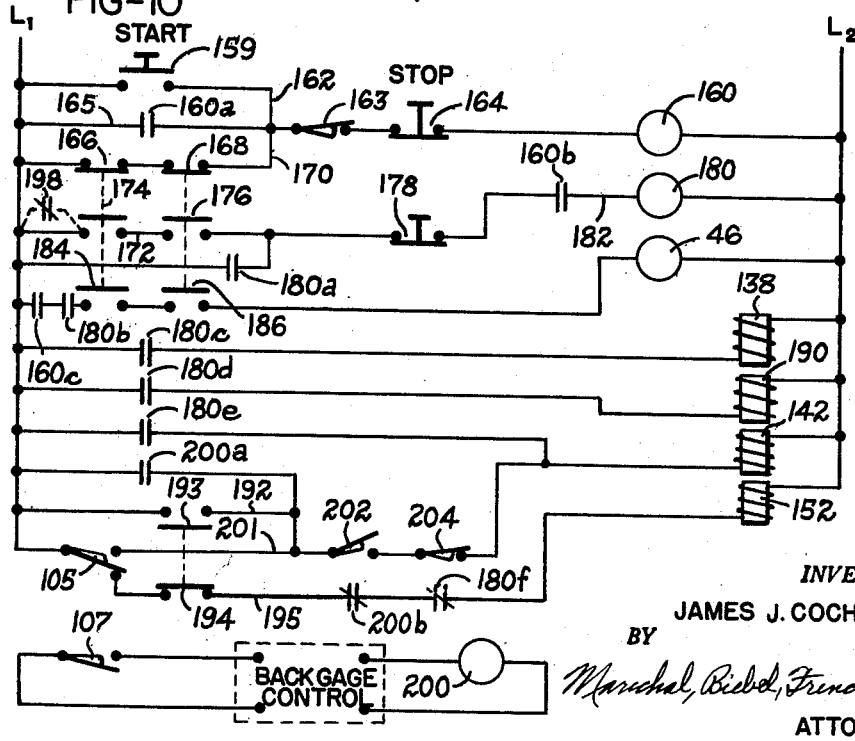
FIG. 10 is a schematic diagram of a suitable electrical circuit showing the electrical controls for the various components.

The electrical controls for operation of the various elements are shown in FIG. 10 wherein L1 and L2 are power input lines having a number of parallel circuits therebetween. After the start button 159 is depressed, relay 160 is energized through line 162 and normally closed limit switch 163 and normally closed stop switch 164 to close contacts 160a, 160b and 160c. The limit switch 163, whose function will be described below, opens on the up stroke of the knife and closes before the knife stops at the top of the stroke. The circuit in line 165 is controlled by two hand operated switches 166 and 168 which complete the circuit in line 170 to provide a shunt for relay 160 until such time as relay 160 is closed, thereby closing contacts 160a and locking the circuit into operation. Circuit line 162 is normally open until series switches 174 and 176 are closed by the operator engaging the conventional safety handles (not shown) which initiate the clamping and cutting cycle. The clamp switch 178 is normally closed and remains closed since it is an emergency switch which returns the clamp to its top position at any desired time.

Contacts 160b having been closed, closing of switches 174 and 176 completes the circuit to relay 180 through line 182. As relay 180 closes, contacts 180a, b, c, d and e are closed while normally closed contacts 180f are opened. With the closing of contact 180a, switches 174 and 176 will be by-passed to lock circuit 182 in operation. Simultaneous with the closing of switches 174 and 176, switches 184 and 186, which are ganged thereto, are closed and contacts 160c and 180b being closed, clutch 46 is energized.

With the energization of relay 180 the following occurs; clamp valve solenoid 138 is energized since contacts 180c are closed, the safety latch solenoid 190 removes pin 192 (FIG. 3) from the knife actuating assembly allowing the knife to make a cutting stroke since contacts 180d are closed, and the closing of contacts 180e allows energization of the dump solenoid 142 for controlling the dump valve which isolates line 140 from the low pressure return line or tank T. The gage or clamp control valve 155 is not activated since normally closed contacts 180f are opened as the relay 180 is closed. By the time knife 16 enters the pile, the clamp is in the clamping position and the pile is held firmly.

After the cut has been made, the operator releases the safety handles and switches 174, 176, 184 and 186 are opened, and as the knife moves upward to the raised position, limit switch 163 opens to deenergize relay 160 which opens contacts 160b to deenergize relay 180 resulting in opening of contacts 180a, b, c, d and e, allowing contact 180f to close.. Also, 160c opens to open clutch relay 46 even if the operator continues to energize the safety handles thereby maintaining switches 184 and 186 closed during the clamping and cutting stroke. Thus at the end of the cycle, another cycle cannot be initiated automatically without first releasing the handles which allows relay 160 to energize as limit switch 163 closes due to the fact that the knife is now in the fully raised position and the mechanically controlled limit switch 163 has closed as above described. This much of the circuit is conventional and for a further description thereof reference is made to the U.S. patent to Barley et al. 2,649,153 issued September 4, 1948, and the above mentioned Spiller et al. patent or U.S. patent 2,939,357 of Russell I. Haywood issued on June 7, 1960, all assigned to the same assignee as this application.

To allow use of the clamp control assembly, the basic circuit discussed above has been modified by including therein a parallel circuit 192 having a gage switch 193 for allowing the use of the clamp control assembly, if desired. With the gage switch in the position shown in the drawing, and contacts 194 closed, the clamp control assembly is in operation. Switch 105, which is in circuit 195 to control solenoid 152 of the clamp control valve 155, is operated by the sensor along with switch 107, the latter acting as an interlock to prevent operation of the back gage. With the sensor contacting switches 105 and 107, the clamp is in the raised position and switch 107 is closed, thereby enabling the back gage or spacer to operate. If an automatic spacer or back gage is employed, normally closed interlock 198 is placed in the circuit preventing movement of the clamp and knife during movement of the back spacer.

In addition to these controls, an interlock 200 with normally open contacts 200a and normally closed contacts 200b is employed during movement of the back gage or spacer. As interlock 200 is energized by the rearward movement of the back gage, as when a cutting job is completed, contacts 200b are opened preventing an energization of solenoid 152 but enabling operation of solenoid 142. A clamp switch 202 which is opened as the clamp is in the fully raised position, and a normally closed treadle switch 204, are placed in series with the solenoid 142 to allow manual control of the clamp.

The operation of the circuit is as follows: assume that the clamp control assembly is being employed and a cut has been made. Switch 163 opens, deenergizing relay 160, relay 180, clutch 46, solenoid 138, and safety pin solenoid 190, as described. Since the clamp is down, switch 105 is connected to line 201, and switch 202 is closed, causing the dump solenoid 142 to be energized and thereby raising the clamp. As the sensor is carried by the follower against switches 105 and 107, the solenoid 152 is energized, since switch 194 is closed and contacts 200b and 180f are normally closed as relays 180 and 200 are deenergized. With the closing of switch 107, the back gage or spacer is now able to operate for advancing the pile for the next cutting stroke. At the same time that solenoid 152 is energized, solenoid 142 is deenergized since line 195 is opened, and switch 193 is opened as well as contacts 200a. As the back gage moves, interlock 198 is opened thereby preventing operation of the clamp.

The operator then performs the next clamping and cutting cycle, and relay 180, clutch 46, solenoids 138 and 142, and safety pin solenoid 190 are energized as discussed above. Once the solenoid 138 is energized, the clamp begins to move and switch 105 closes circuit 195, while switch 107 opens thereby preventing operation of the back gage or spacer. At the same time that relay 180 is energized, normally closed contacts 180f are open and hence there are two ways for effectively taking solenoid 152 out of the circuit. If it is assumed that this is the last cutting cycle in a given operation, and that the operator employing apparatus well known in the art is preparing to return the back spacer to the start position, as the back spacer moves to the rear position, contacts 200b are opened and contacts 200a are closed. This latter operation takes solenoid 152 out of the circuit and allows the clamp to move to the fully raised position as the back gage is moved to its starting or rearward position. As the clamp comes to the fully raised position, clamp switch 202 is opened thereby deenergizing solenoid 142 and stopping the clamp in the fully raised position. The cutter is now prepared for the next cutting operation.

If desired, the cutter can be operated without the clamp control assembly by positioning switch 193 to make contact in circuit 192 thereby opening switch 194. In this mode of operation, the clamp will move to the fully raised position and solenoid 142 will be deenergized by the opening of clamp switch 202.

If the operator desires to raise the clamp to the fully raised position without moving the back gage, switch 193 is moved to complete circuit 192, the clamp is brought down in a clamping stroke and will be raised to the fully raised position as described above.

During movement of the clamp by operation of the conventional treadle assembly, the operator depresses the treadle which opens and then closes switch 204. If the clamp is at some position short of the fully raised position, clamp switch 202 is closed, while switch 105 opens circuit 195. As the treadle is depressed, a mechanical cable assembly shown schematically at 220 in FIG. 9 moves the valve 135 into a position in which fluid is ported from conduit 132 to the low pressure system T. As the clamp begins to move, sensor 86 moves off switch 105 and the circuit 195 is completed. As the operator continues to depress the treadle, the clamp valve 144 is activated giving an increase in pressure until by complete depression of the treadle, full clamp pressure is applied.

Should the clamp be in the fully raised position, depression of the treadle causes valve 135 to allow fluid to flow in conduit 132 to the low pressure line. As the clamp moves down, switch 202 is closed and the operator may by operating the treadle, bring the clamp to any downward position or apply full clamped pressure. It should be noted that whenever the clamp is raised to the fully raised position, solenoid 152 is effectively taken out of the circuit either by having switch 194 open or having contacts 200b open.

The clamp control assembly constructed in accordance with the above disclosure enables a more rapid clamping and cutting operation in view of the fact that the clamp need not be fully raised. Moreover, due to the fact that that clamp is self-seeking with respect to its raised position in relation to the surface of a pile of paper, regardless of the height thereof, repeated adjustments of the raised position of the clamp are unnecessary and thereby facilitate the clamping and cutting operation inasmuch as once the raised position of the clamp has been adjusted, a series of cutting operations may be made without any further adjustment of the clamp.

While the forms of apparatus herein described constitute preferred embodiments of the invention, it is to be understood that the invention is not limited to these precise forms of apparaus, and that changes may be made therein without departing from the scope of the invention which is defined in the appended claims.

What is claimed is:

1. A cutting machine comprising a power operated knife blade having a guillotine-like cutting stroke for cutting through a pile of sheet material, a clamp member positioned proximate to said knife blade for holding said pile during said cutting stroke, means including a hydraulically operated piston for moving said clamp member to a clamping and non-clamping position, a clamp control assembly for determining the position of said clamp in the non-clamping position including a housing containing therein a switch for controlling said hydraulically operated piston, an adjustable stop spaced from said switch, sensor means adapted to travel between said adjustable stop and said switch, and a follower moving with said piston and extending through said sensor means to move said sensor means against said adjustable stop as said clamp moves to the clamping position and for moving said sensor against said switch as said clamp moves to the non-clamping position to control the raised position of said clamp member in accordance with the adjustment of said stop.

2. A clamp assembly for use with a paper cutting machine and the like comprising a clamp member movable to a clamping and non-clamping position and supported on a frame member, a driving rod supported by said frame member and having a driving linkage on each end thereof connected to each end of said clamp member for moving the same to a clamping and non-clamping position, a hydraulic motor connected to rotate said driving rod for moving said driving linkage and said clamp member, a control assembly operatively connected to said clamp member including a housing rotatably affixed to said frame member and containing therein a switch for controlling said hydraulic motor, an adjustable stop spaced from said switch, sensor means adapted to travel between said stop and said switch, a follower movable in direct relation to said motor and extending through said sensor to move said sensor against said adjustable stop as said motor moves the clamp member to the clamping position, and to move said sensor against said switch as said motor moves the clamp member to non-clamping position for controlling the raised position of said clamp when in the non-clamping position in accordance with the adjustment of said stop.

3. In a cutting machine adapted to cut piles of material of various heights and including a power operated knife movable to cut said pile of material, and a work table for receiving the material being cut, the combination of a clamp assembly including a clamp member movable to a clamping position from a fully raised position, a driving rod assembly operatively connected to said clamp member and having affixed thereto a rocker arm for rotating said driving rod assembly to move said clamp member, a power assembly connected to move said rocker arm for actuating said driving rod assembly, self-adjusting control means including a follower connected to move with said rocker arm for sensing the position of said clamp member, sensor means movable by said follower through a limited range of motion, and an actuator incorporated in said control means and operable by said sensor means to halt said clamp member the same preset distance above said pile and intermediate said clamping and fully raised positions regardless of the height of said pile.

4. A clamp control assembly for use with a paper cutter and the like having a back gage for advancing a pile of paper in stepwise fashion for a cutting stroke and means to return said back gage to a start position comprising a clamp movable from a fully raised position to a clamping position halting the pile for cutting, means to position said clamp after the first clamping operation thereof in a partially raised position a preselected distance above the surface of said pile in accordance with a preselected adjustment, and means for raising said clamp to said fully raised position as said back gage is returned to the start position for allowing the insertion of a second pile having a greater height than that previously cut, said first named means being operative to position said clamp in a raised position above said second pile the same distance said clamp was raised above said pile during the previous cutting cycle.

5. In a cutting machine including a work table for receiving piles of material of various heights to be cut, power operated knife means movable towards said cutting table for severing a pile of material thereon, and power operated clamp means movable from a fully raised position to a clamping position for holding the pile on said table during a cutting stroke of said knife; the improvement comprising control means to position said clamp means in a partially raised position a preselected distance above the surface of the pile on said table in accordance with a preselected adjustment, self-adjusting means governing the operation of said control means for positioning said clamp means intermediate the fully raised position and the clamping position thereof by approximately the same relative distance above the top surface of the pile being cut regardless of the height of the pile, and means enabling said clamp means to be moved to its fully raised position while allowing said adjustment to remain the same for enabling said clamp means to be raised the same preselected distance above a second pile in accordance with said adjustment.

6. In a cutting machine adapted to cut piles of material of different heights including a power-operated knife arranged to cut the piles selectively and a work table for holding the piles of material to be cut, the combination of a clamp member mounted adjacent the knife for movement between a fully raised position away from the table and a clamping position holding the pile against the table during a cutting operation of the knife, a hydraulic cylinder connected to move said clamp member between its fully raised position and a clamping position, a follower member connected to be moved with said clamp member by said hydraulic cylinder, sensor means frictionally engaging said follower member causing said sensor means to tend to move with said follower member but allowing for relative movement between said follower member and said sensor means, a stop mounted to engage said sensor means to limit the motion thereof with said follower member in the direction corresponding to clamping movement of said clamp member, control means including an actuator operable by said sensor means and operatively connected to stop the motion of said hydraulic cylinder in a direction to move said clamp member toward its fully raised position, and means mounting said actuator in spaced relation to said stop and on the opposite side of said sensor means from said stop whereby a predetermined movement of said sensor means with said follower member away from said stop during the raising of said clamp member causes said sensor means to engage said actuator means to halt the raising motion of said clamp member at a partially raised position spaced from the top of the pile.

7. In a cutting machine as defined in claim 6, means for adjusting the position of said stop with respect to said actuator to predetermine the distance through which said clamp member will be raised from the top of a pile to the partially raised position.

8. In a power-operated cutter adapted to cut piles of material of great heights including a power-operated knife arranged to cut the piles selectively and a work table for holding the piles of material to be cut, the combination of a clamp member mounted adjacent the knife for movement between a fully raised position away from the table and a clamp position engaging the top of a pile and pressing the pile against the table, drive means for moving said clamp member selectively between said positions, a follower member movable with said clamp member, a sensor frictionally engaging said follower and tending to move therewith in a first direction corresponding to raising motion of said clamp member and a second direction corresponding to clamping motion of said clamp member, a stop mounted to limit the motion of said sensor in said second direction, an actuator mounted to be engaged by said sensor in response to movement thereof in said first direction away from said stop, and control means for said drive means responsive to engagement of said actuator by said sensor to halt the operation of said drive means in a direction raising said clamp member from its clamping position at a partially raised position spaced from the top of the pile but short of the fully raised position.

References Cited by the Examiner
UNITED STATES PATENTS

| 1,710,084 | 4/29 | Berry | 83—390 |
| 1,880,598 | 10/32 | Tyler et al. | 83—381 |
| 2,223,878 | 12/40 | Spiller et al. | 83—381 |
| 2,599,591 | 6/52 | Spiller et al. | 83—381 X |
| 2,681,104 | 6/54 | Barney et al. | 83—390 |

ANDREW R. JUHASZ, *Primary Examiner.*

CARL W. TOMLIN, *Examiner.*